(12) United States Patent
Byma

(10) Patent No.: US 6,413,613 B1
(45) Date of Patent: Jul. 2, 2002

(54) AUTOMOTIVE HEADLINERS AND RELATED ARTICLES

(75) Inventor: George Byma, Clarkston, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/649,249

(22) Filed: Aug. 28, 2000

(30) Foreign Application Priority Data

Aug. 27, 1999 (GB) .............................................. 9920297

(51) Int. Cl.$^7$ ................................................. B32B 3/12
(52) U.S. Cl. ................. 428/116; 428/131; 428/157; 428/159; 428/213; 428/218; 296/188; 296/214; 264/46.4
(58) Field of Search ......................... 428/76, 213, 131, 428/137, 159, 182, 160, 218, 157, 116, 117, 31; 296/214, 211, 39.1, 189, 188; 264/46.4

(56) References Cited

U.S. PATENT DOCUMENTS

| 4,263,356 A | 4/1981 | Nomura et al. |
| 5,417,788 A | 5/1995 | Holt |
| 5,833,304 A | 11/1998 | Daniel et al. |

FOREIGN PATENT DOCUMENTS

| DE | 41 31 394 A1 | 4/1993 |
| DE | 296 07 262 | 10/1997 |
| EP | 0 057 886 | 8/1982 |
| EP | 0 767 037 A2 | 4/1997 |
| EP | 0 787 578 A2 | 8/1997 |
| EP | 0 882 622 A2 | 12/1998 |
| FR | 2 470 679 | 6/1981 |
| FR | 2 727 189 | 5/1996 |
| GB | 1 492 752 | 11/1977 |
| GB | 2 150 087 A | 6/1985 |
| WO | WO 97/10950 | 3/1997 |
| WO | WO 97/32752 | 9/1997 |
| WO | 99/35007 | 7/1999 |

OTHER PUBLICATIONS

Search Report, Nov. 28, 2001.

Primary Examiner—Deborah Jones
Assistant Examiner—Abraham Bahta
(74) Attorney, Agent, or Firm—Brooks & Kushman P.C.

(57) ABSTRACT

An automotive interior trim product, for example a headliner, and method of producing such a product. The product comprising an energy management element which is adapted to be secured to an automotive interior to provide an energy management function. The energy management element is fabricated from a material comprising an array of fused or bonded tube-like members, and comprises a one-piece unitary structure with zones of differing physical properties. The zones of differing physical properties provide different levels of energy management which are matched to the requirements of the interior. The differing physical properties and so differing levels of energy management in the different zones being produced by molding of the unitary element. Alternatively, and/or in addition within the fused array differing types of tube-like members may be used in the differing zones. Such differing types of tubes may have different wall thicknesses, different diameters/dimensions.

39 Claims, 9 Drawing Sheets

AUTOMOTIVE HEADLINERS AND RELATED ARTICLES

CROSS-REFERENCE TO RELATED APPLICATIONS

This application claims priority from U.K. Patent Application No. GB 9920297.0, filed Aug. 27, 1999.

TECHNICAL FIELD

This invention relates to automotive vehicles and more particularly to materials and components for use in automotive vehicles, particularly as the interior trim for such vehicles, notably the materials used as lining materials for the driver and passenger seating locations in such a vehicle.

BACKGROUND ART

The invention relates to a material and article for use as a headliner, i.e. a material and product for lining the region of the driver and passenger compartment roof which is in proximity to the heads of persons traveling in the vehicle and that provides cushioning. Indeed, such materials are the subject of regulations and associated legislation so far as vehicle manufacturers are concerned. In particular, in the U.S. the Federal Motor Vehicle Safety Standard 201 defines particular impact characteristics and requirements for automotive interiors. Similar such regulations exist and/or are being considered in Europe and other countries. Some aspects of the present invention are also, however, applicable outside the field of headliners but in related automotive and other applications.

Automotive headliners for current vehicle operating conditions are required to fulfill several functions. They need to present a cosmetically pleasing surface finish to the vehicle roof inside surface. They are also now required to provide energy management (arising from a requirement to absorb energy upon impact with the headliner by a person's head). They are also required to provide a degree of acoustic damping in order to reduce noise in the vehicle. In addition, we have discovered that such structures should be of an integrated structure in which the headliner provides a structural function in terms of presenting a unified structure in which the parts of the structure which contribute to the overall energy-management and other functions are integrated into a generally one-piece structure which presents a unitary basis for providing the requisite structures and functions of a headliner.

The requirements for energy management of an automotive interior as a whole (e.g. headliner in combination with roof structure) are specified (at the present time) in Federal Motor Vehicle Safety Standard 201, which is incorporated herein by reference. This standard sets a maximum HIC value (as defined in the standard) which the interior as a whole should comply with. The HIC value for the interior as a whole defines and indicates the impact characteristics and effect of the interior when impacted by an object, e.g., a person's head.

With regard to these functions and regulations, we mention the following. In principle, a headliner requires a greater degree of energy management ability in those areas of its structure where the vehicle roof structure to which it is attached has the greatest stiffness and rigidity. Such areas are generally located somewhat laterally of the driver and front seat passenger(s), although other regions of the roof may also be particularly stiff or rigid and require a greater degree of energy management. On the other hand, where the vehicle roof structure is less rigid and more able to deflect (an example of which is the more central region of the roof structure of a vehicle in which the less-structurally braced roof panel is able to deflect under impact) the headliner itself does not need to provide a significant energy management level and a headliner which provides a lower energy management quotient can be accepted in such regions. Accordingly, the requirements of a headliner structure which, in an integrated fashion, is required to span the driver/passenger head location region between and including these regions of varying stiffness and rigidity, likewise vary considerably. For example, where the roof structure is the most rigid, the higher energy management requirements are imposed and required for the headliner and these corresponding regions of the headliner should have a corresponding higher or highest ability to absorb energy upon impact or like circumstances in order that the interior as a whole meets the requirements and new regulations.

An example of a prior headliner proposal which provides for energy absorbency is described in International Patent Application WO 97/109050. This proposal suggests the use of a foam material which is impregnated with a hardening compound in order to provide an energy absorbent headliner. It also describes selectively impregnating different areas of the foam forming the headliner with different amounts of hardener in order to selectively vary the energy absorbent properties. It should be noted that a fiberglass reinforcing layer is incorporated with the foam core to provide structural strength.

A further energy absorbent headliner is proposed in EP 0,882,622. This headliner again uses a foam material which is bonded onto a backing, or reinforcing sheet. To provide selected areas, in particular the marginal areas, with improved energy absorbing properties, additional separate foam panels are provided and bonded to the marginal areas of the headliner.

WO 97/32752 discloses a different type of headliner which comprises a plastic honeycomb core as opposed to the foam cores proposed in the above prior patents. The objective of this configuration though is to provide a more easily recyclable headliner structure. Consequently, problems associated with having to trim considerable amounts of excess material from the formed structure in order to produce the required shape of the headliner are addressed by making the headliner material more easily recyclable. It is not apparent from this proposal that energy absorbent properties are provided by this proposed structure or how, or even if, specific areas are provided with different energy absorbent properties. Indeed, this proposal simply states that it provides good strength and acoustic characteristics. Furthermore, such a plastic honeycomb structure described in this proposal would generally be expected, by virtue of the strength and stiffness of the honeycomb structure, to provide little or no energy absorbency. The interior structure proposed is also relatively heavy and costly to produce since the entire uniform structure would be required to have the maximum required level of energy management/absorbency if it is to be adapted to comply with the new regulations and requirements.

It is also mentioned that a large number of conventional prior art headliners currently in use do not provide any significant energy management or absorbent function. Conventionally, headliners for automotive vehicles have been designed to simply provide a decorative function and to provide acoustic insulation.

Other existing proposals for automotive headliners likewise leave something to be desired in terms of efficacy, simplicity of construction, weight and/or ease of installation and/or related cost factors due to their complex construction and wastage involved in their installation, and can be improved.

DISCLOSURE OF INVENTION

A desirable object of the present invention is to provide materials and articles applicable to use as automotive headliners, and for analogous uses offering improvements in relation to efficacy and/or, ease of manufacture and/or ease of installation and/or simplicity of structure and/or versatility, efficacy and/or cost, weight and/or improvements generally.

One aspect of an embodiment of the present invention is predicated on the use, to form an automotive headliner and, in particular, an energy absorbent core structure for an automotive headliner or similar, from a material formed by the joining of straw or tube-like polymeric elements into a coherent mass, for example a block or sheet. In such a material, the polymeric tubes are caused to cohere by a suitable process of cohesion, for example heat-welding or thermal fusing. Such materials are not new in themselves. The general manufacturing process to fabricate such materials is thus also not unknown to the person versed in the art. An example of such a material can be obtained from the firm Trauma-lite Limited of Manchester.

The aforesaid materials are initially formed in block or thick sheet format and then, for typical applications, that block or thick sheet is sliced or cut to produce a sheet or the like which can be conveniently used for applications in which the honeycomb format, the flexibility of the material, energy absorbent properties given by the tubular elements, and distinct method of manufacturing the material can be utilized to advantage.

For the purposes of one aspect of the present invention and its particular embodiments, the basic starting material on which this aspect of the method and product is based, as identified above in general terms, and regardless of its basic structure and method of manufacture (as opposed to the changes in these introduced by the invention and its embodiments) will be referred to as "materials of the kind described".

It should be noted that such honeycomb materials, formed from individual tube-like polymeric elements which are fused together into a unitary structural member, differ substantially both in terms of construction, manufacture, and impact absorbing properties and mechanics from conventional foam materials generally used to provide for impact absorption within conventional headliner assemblies. This material can to some degree and in some respects also be contrasted with conventional honeycomb materials which may also be used to form headliner or other trim assemblies and which are generally produced in very different ways. There are however some similarities between a conventional honeycomb and the material of the kind described. Accordingly, while some aspects of the invention, and the preferred arrangement, are related to the specific material of the kind described, the principles once appreciated in relation to this specific material, can be applied to other similar honeycomb materials and such materials can be accordingly adapted along the lines described.

This aspect of the present invention and its embodiments seek (inter alia) to utilize this material, and various advantageous qualities of the material, to provide a particular advantageous application of the material in order to improve significantly the efficiency of manufacture and/or installation and/or effectiveness in use of automotive interior trim components, particularly headliners and the like.

Accordingly, one broad general aspect of the invention is the use of such a material comprising a fused array of tube-like members to provide an energy management element of an automotive trim product, and in particular of a headliner. In such an arrangement, an automotive trim product with the desired and required energy management capabilities is provided by the advantageous utilization of the energy absorbing capabilities of the material of the kind described. In particular, a headliner of a roof assembly of the present invention would preferably cooperate to provide a value of not more than 1,000 HIC(d) thereacross as measured in accordance with Federal Motor Vehicle Safety Standard 201.

A particular feature of an automotive trim product incorporating an energy management core element comprising an array of fused tube-like members, forming a material of the kind described above, is of the array of fused tube-like members having, and being adapted to have, within the same, substantially one-piece, element integral selective regions (or portions) which are adapted to have different levels of energy management.

An energy management element in which integral selective regions (or portions) of the same, substantially one-piece, unitary element have different energy management properties provides a trim product which can match the localized different energy management requirements of the interior. Such a trim product can be contrasted with conventional designs in which the energy management element provides uniform levels of energy management or, to provide different levels of energy management, additional, separate additional energy management elements (e.g. additional foam blocks) are generally added.

Using a material of the kind described within an automotive trim product, and in particular a headliner, the physical properties, notably the degree of stiffness and/or hardness and/or resilience, may (in alternative and secondary embodiments) be varied by varying the physical properties of some of the tubular or straw-like elements of the one-piece unitary fused array and structure. For example, the cross-sectional diameter or major dimension (if not circular), and/or the wall thickness of those tube members, could be varied. Also, by providing a partial or complete filling of material within the internal spaces or voids of the tube members the properties can be altered and selectively adjusted.

In this way, the material of the kind described can be provided with zones or areas of differing resilience and/or compressibility and/or other physical properties within the structure of a one-piece element whereby, by appropriate placement and choice of these zones in which tube-like members with different properties are used, the differing requirements of an automotive interior trim product such as a headliner can be conveniently accommodated in a unitary product element.

Accordingly, under this aspect and embodiment of the invention there is provided a product and a method of making same, for example an automotive headliner which, in a one-piece unitary construction formed from a material of the kind described, there is provided the relative versatility of incorporating in the product zones of differing compressibility (and energy management) and/or other physical properties, in accordance with the many and varying differing design and layout aspects from one automotive vehicle interior to another. Such an ability and possibility is provided, in part, by the use of the material of the kind described. The headliner is accordingly adapted to provide, and provides, a unitary structure with varying degrees of energy management according to the varying requirements from place to place of the interior.

By providing variations of the density and/or other physical properties of the material of the kind described, the advantage is offered of reducing the cost of the material in those locations where such is possible. To put it another way, the honeycomb structure varies from place to place in the product according to the localized requirements thereof, thereby reducing cost and increasing cost-effectiveness. In this regard it should be noted that the material of the kind described, and honeycomb material in general, when configured to provide a high degree of energy management function are costly to produce. Use of separate, distinct sections of material tailored to provide different energy management functions to reduce the costs has the disadvantage of reducing the structural integrity. By using the material of the kind described or similar, and by selectively tailoring the energy management properties in selective regions of the same one-piece unitary integrated element, however, a cost effective product with sufficient structural integrity can be produced.

In particular, according to this aspect, the fused array of tube-like members forming the energy management element may comprise different individual types of tube-like members which are fused together into the unitary fused array. The different types of tube-like members have differing physical properties, and so provide differing levels of energy management capability.

It will be recognized that due to the way in which conventional honeycomb and foam structures are conventionally produced it is not generally possible to, within an integral one-piece unitary structure, use different cell types (corresponding to different tube-like members of the array) and provide selective regions of an integral structure with different physical properties and energy management properties. The relatively new material of the kind described can, however, provide this function since it is formed in a different way from individual tube-like elements which are then fused together to produce a unitary, integral, integrated coherent structure. However, having appreciated the benefits, as described herein, of this aspect in relation to the material of the kind described, the same or analogous principles can be applied and used in conjunction with other similar and/or related honeycomb structured materials and the method of producing such materials altered to incorporate the benefits.

The material of the straw or tubular elements may be chosen by the skilled person according to the requirements of the particular application and in particular the tube-like members in different regions of the array may be of various different polymeric and/or other materials (generally plastics) with or without fillers and extenders and having different properties. Materials to be considered include not only polypropylene but also polycarbonate, polyethylene and polyesters.

Where the hollow or tubular elements which make up the honeycomb structure are to be fully or partially filled in order to alter the properties, then a suitable material may include polyurethane foam (or polymer fibers or other suitable acoustic materials) to serve as such filling. Where the product requires an indicator providing information as to use and extent of use, then it is believed to be technically feasible to include within the product an impact-responsive dyestuff or the like which will produce a visible color change upon the occurrence of a significant impact with the headliner or other article, so that the need for replacement after a vehicle impact or other event may be readily identified.

In another aspect of the invention, which may be used separately or in combination with the above aspect, the energy management element comprising the array of fused tube-like members, comprising a honeycomb-like assembly of the material of the kind described, is molded to shape. In this way these embodiments of the invention are able to produce a dimensionally-accurate molded structure according to the spacial requirements imposed by the dimensions and shape of the vehicle roof structure while nevertheless providing the required energy management functions in terms of an ability to absorb kinetic energy by deflection and/or buckling of the cross-sectional shape of the tubular elements upon impact.

Such use of the inherent energy management properties of the tubular elements in combination with the hitherto unsuspected ability of the material of the kind described to be molded into a coherent structure presenting physical properties usefully different from those of the unmolded sheet material (of tubular elements) represents a significant advance in the art of constructing headliners. Such a molded no-trim headliner structure in itself is a step forward with respect to previous headliner proposals and uses.

In this way the main structure of the product (for example an automotive interior trim product, in particular a headliner) is formed as a molding-to-size of a sheet or the like element of a material of the kind described. By forming a headliner as a pre-molded (to size) product from a material of the kind described there is provided an improved headliner which is better adapted to the physical requirements of the specific automotive interior location and is more efficiently manufactured and installed than the existing resilient materials which are currently used in this specific location, not to mention the fact that these latter materials are used in multi-piece format in order to accommodate the vagaries of the internal structure (including both vehicle strengthening frame elements and the like, and the sheet metal covering). The headliner provided by this embodiment of the invention is molded to the specific shape and size and may include, for example, a suitably shaped and sized pre-formed sun roof opening to accommodate that function where required.

Such an automotive interior trim product, particularly a headliner, is molded to shape and size, and may include suitably in-molded openings such as for a sun roof, and which is in, preferably, one-piece format and requires no, or at least little/minimal (considerably less than with conventional methods), final trimming to-size on assembly.

The molding process enables the production of a unitary structure having the required dimensional characteristics as mentioned above.

Furthermore, and in a further aspect, the molding of the energy management element surprisingly and unexpectedly, has several additional distinct functions and advantages. In particular it has been found that the molding process can be adapted to cause the tubular elements to be permanently deformed in the required locations or zones or regions, so that the uniform cross-sectional shape of the tubular elements is at least in the outer (meaning opposite sides or upper or lower) regions of the headliner permanently deformed so as to change the structure of these tubular elements so that they are caused to have a reduced crushable or deformable cross-section and thereby their energy management function is likewise altered. Accordingly, the molding technique can be arranged and adapted to alter the energy management capability of selective regions of the energy management element as discussed above under the previous aspect of the invention.

Existing research and development shows that the molding alteration of the structure of the coherent mass of tubular elements produces an important change in the structure and energy management function of the tubular elements, whereby they are caused during the molding process to adopt a permanently reduced or changed cross-sectional profile. Generally it is understood that the stiffness of the honeycomb or the like assembly of tubular elements is increased and the slope of the graph of deflection of the structure under load or impact against load or impact is steepened in the direction indicating a higher rate of rise of resistance to actual deflection.

Accordingly, this discovery of the ability of the tubular elements to provide a changed stiffness and energy management function in response to conditions and configurations adopted during molding means that these embodiments of the invention are able to provide not only a molded and integrated headliner having the required dimensional and format/configuration requirements, but also the product can be provided with energy management qualities, which may or may not vary from place to place, in accordance with the particular requirements of the intended use.

Accordingly, one broad aspect of the invention provides a molded headliner structure. The headliner structure is dimensioned and configured, at least in part by the molding operation, to conform to the corresponding dimensional and configuration requirements of a vehicle roof structure.

Another broad aspect of the invention provides a vehicle headliner or the like in which an assembly of tubular elements is molded to vary its physical characteristics such as crushability and/or deformability and/or stiffness or rigidity, according to the local requirements of the configuration of the vehicle roof structure.

Embodiments of the invention may also adopt an approach in which the energy management function of the headliner is varied by providing differing depth of the headliner in terms of differing thickness of the crushable or deformable tubular element cross-sections. In these embodiments such variation of depth may be provided by an approach in which the energy management function is varied by use of the molding technique to modify or reduce the available crushable or deformable aggregate cross-section of the tubular elements, by modification of this latter factor during the molding process of the headliner. Accordingly, the molding technique varies the available crushable depth of the material. Alternatively, the depth can be varied in other ways.

In the regions of higher energy management requirements, these requirements may be met by the provision of a corresponding depth of the energy management element and array of fused tubular elements. The depth (in terms of deflectable or crushable cross-sectional shape) provides the corresponding energy management function. Likewise where a lesser degree of energy management is needed, a lesser depth of crushable or deflectable cross-section of tubular elements is provided.

It has also been found that this molding of the energy management structure to shape it to size and/or the alteration and provision of localized differing energy management properties in a unitary energy management structure is not limited to energy management elements formed from materials of the kind previously described. In particular, the molding technique can similarly and analogously be used to alter the shape and/or energy management properties of any energy management material comprising a coherent structure comprising an array of laterally interconnected tubular or cellular elements. Such molding advantageously provides similar results and advantages. Indeed this molding aspect, as with some of the previously mentioned aspects, can be applied to energy management structures comprising unitary or coherent honeycomb or cellular materials regardless of how the particular material forming the energy management element is initially produced. Accordingly, under this aspect of the invention, an automotive interior trim product comprises an energy management element produced by molding a sheet of honeycomb or other similar cellular type material with the molding operation adapted to vary the localized energy management properties of particular regions of the molded energy management element.

A further aspect of the invention relates to the use of blocks of the material of the kind described which are formed to the desired cross-sectional shape and size so that layers thereof removed, as in effect blanks for molding or other manufacturing steps to produce a headliner of other trim panel, are already suitably sized and shaped. Such can be formed by closely packing the tube-like elements into a suitably shaped former. When the elements packed in the former are fused together then the block of material produced, and the layers sliced therefrom will have a shape corresponding to the former. Consequently, the layers sliced from the block (i.e. the blanks of material) to form the energy management element are of a near net shape as compared to the final headliner shape and dimension. This advantageously results in a reduction of wastage of material and trimming of the energy management element to produce a trim product of the required shape as compared to that conventionally required. Again, this aspect is predicated upon the use of the material of the kind described which is different to, and is fabricated in a very different way to that conventionally used to produce, conventional honeycomb structures or foam members. In particular it is not generally commercially viable to directly produce a structure of such a near net shape without trimming.

Previously proposed headliner structures for automotive use have been based on, for example, polyurethane within a fiberglass envelope wherein the envelope or surface layer or layers contributes significantly to the structural integrity of the headliner as a whole. The material of the kind described used in the embodiments of the present invention offers improved structural integrity in its own right. However, it will be appreciated that by employing cover layers or panels (for example of fiberglass or other material) on one or both sides of the array of fused tube-like elements forming the energy management element, the structural strength can be further improved. Such cover panels or layers could also be provided in selective regions to provide localized structural strengthening. In addition to strengthening, such cover layers or panels provide a more aesthetically pleasing surface and may also improve the acoustic properties. These cover panels or layers may be structurally attached to the fused array of tube-like members to form an I beam type structure. Such attachment may be achieved in a molded product during the molding operation. Alternatively the cover panels or layers may be laminated onto the layers of material (or blanks) sliced from the block.

It will be appreciated and recognized that the above aspects and inventive features can be used and found individually or in combination in embodiments of the invention.

BRIEF DESCRIPTION OF DRAWINGS

The present invention will now be described by way of example only with reference to the following figures in which.

BEST MODE FOR CARRYING OUT THE INVENTION

Figure 1:
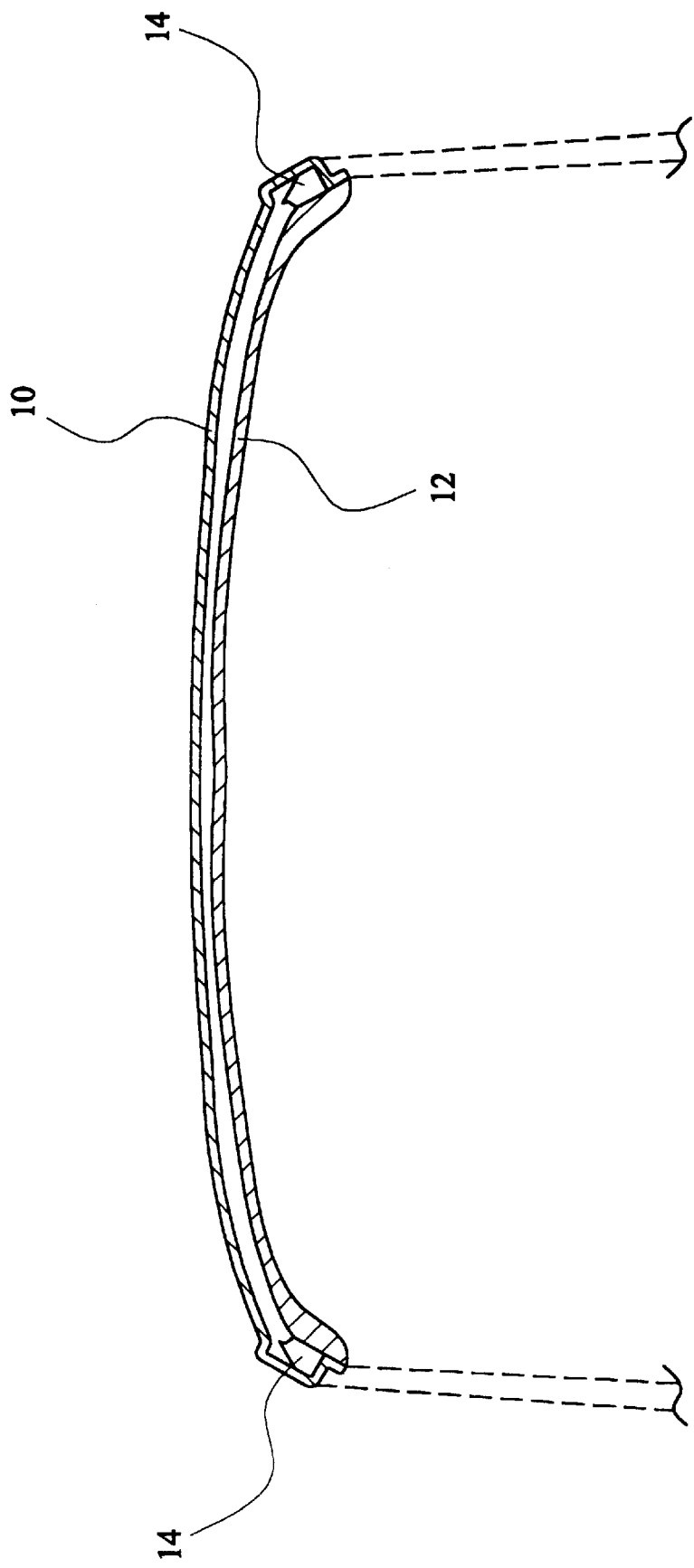
FIG. 1 is a transverse sectional view taken through a headliner embodying the invention as fitted to an automotive roof structure.

Referring to FIG. 1 there is shown an automobile roof 10 having a headliner 12 of the present invention installed therein. The roof 10 includes internal rails 14 that provide strength along the side marginal areas of the automobile body from the front windshield area to the back window area. Edge areas of the headliner 12 are attached to the roof rails 14.

The headliner 12 in this embodiment is produced from a material formed by the joining of straw or tube-like polymeric elements 6 into a coherent mass, for example a block 16 or sheet 18. The polymeric tubes 6 are caused to cohere by a suitable process of cohesion, for example heat-welding. Such materials are not new in themselves. An example of such a material can be obtained from the firm Trauma-Lite Limited of Manchester, England.

Figure 2:
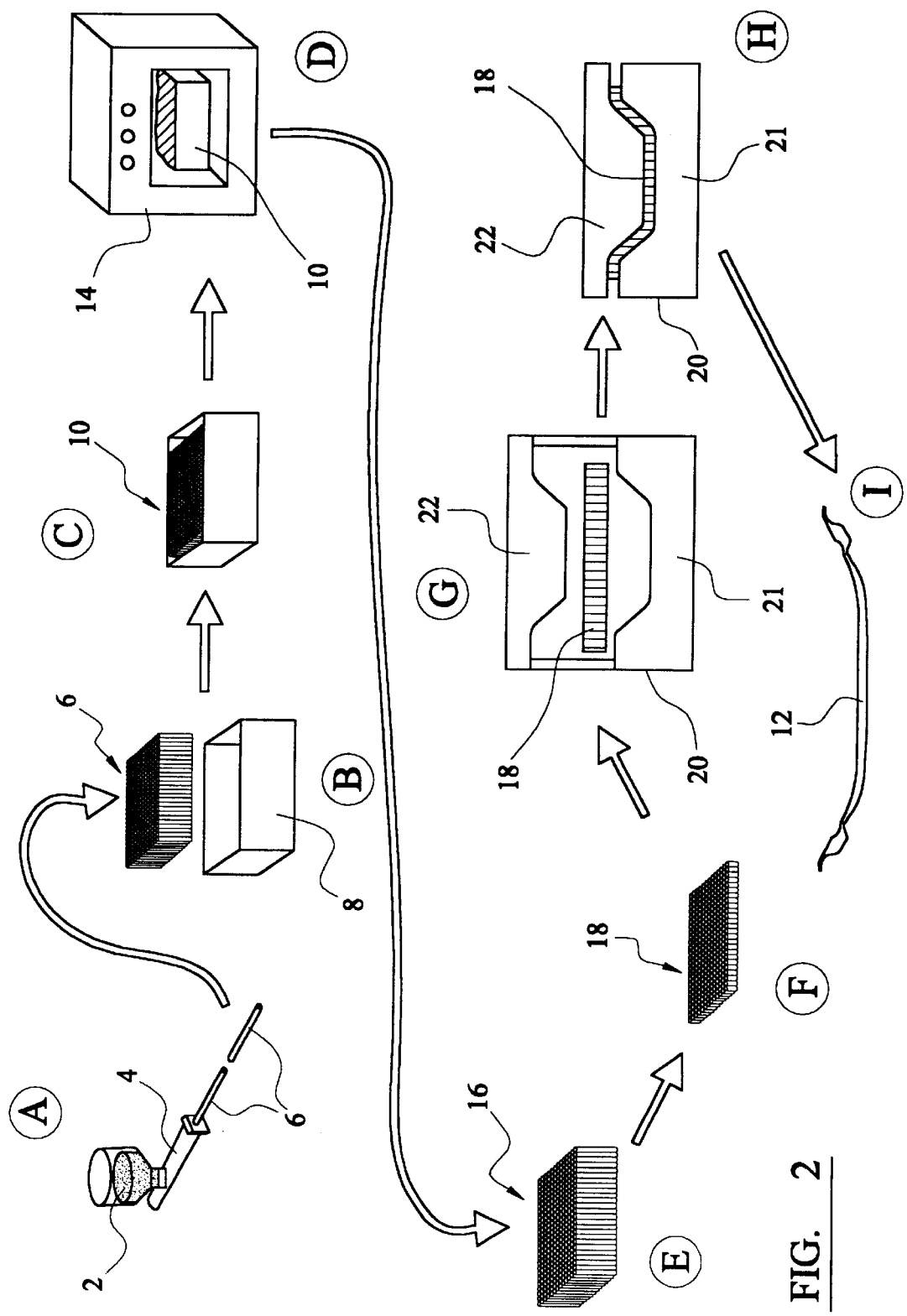
FIG. 2 is a schematic illustration of the steps involved in the production of the headliner structure in accordance with the present invention.

A specific exemplary process and method for producing the headliner 12 is shown in schematic illustrative form in FIG. 2.

Figure 4:
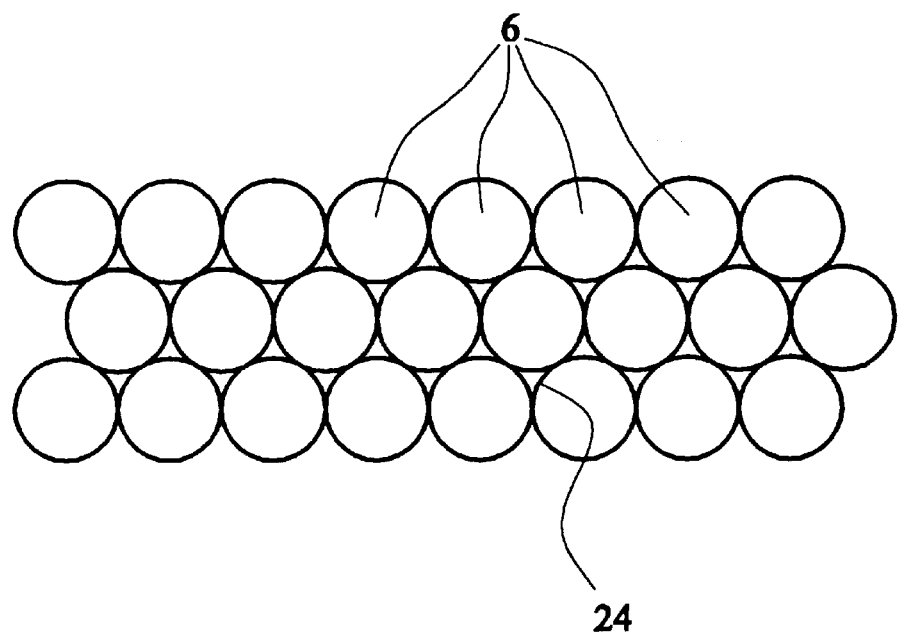
FIGS. 4 and 5 are respective part plan and side views of the arrangement of tube elements used in the method shown in FIG. 2.

In a first step A, tubes 6 are manufactured from a thermoplastic material 2 such as polypropylene, polycarbonate, polyetherimide, polyethylene or polyester for example by an extrusion process from a molten supply of the material 2, using an extruder 4. These tubes 6, of substantially uniform length, are then closely packed within a former assembly 8 as shown in Step B. The closely packed arrangement of the tubes 6 within the former assembly 8 is shown in FIG. 4, which is a plan view of the arrangement of the tubes 6. The former 8 and tubes as an assembly 10 are then transferred C to an oven 14. In the oven 14 the tubes 6 and former 8 are heated D such that the individual tubes 6 packed within the former 8 fuse together to form a unitary body or block 16. The touching walls 24 of the individual closely packed tubes 6 within the former 8 join together as the assembly 10 is heated within the oven 14. The body or block 16 is removed E from the former 8 as a unitary fused entity. The body or block 16 is then sliced F into multiple layers along lateral planes substantially perpendicular to the axes of the tubes 6 to produce a generally planar fused tube element 18. In this way number of fused tube planar elements 18, in the form of blanks, can be produced in a cost effective and rapid manner from a single formed block structure. It is appreciated that the forming of the block 16 from individual tubes is relatively time consuming and therefore by producing a number of elements from the block the individual time and cost to produce the required fused tube planar elements 18 is reduced. The fused tube planar elements 18 are transferred G to a molding apparatus 20 and heated either prior to, or during the molding operation H in order to allow the fused element 18 to be molded 18, and be deformed during molding. The molding apparatus 20 comprises an upper 22 and lower 21 shaped platens which together complimentarily define the profile and shape of the headliner 12. The fused tube planar elements 18 are interposed between the platens 21, 22 and the platens 21,22 are brought together to sandwich the fused tube planar element 18 there between and mold H it to the required non-planar shape of the headliner 12. The molded fused tube planar elements 18 produced by the molding operation H are removed from the mold apparatus 20 and may be trimmed and finished to final size in step I to produce the finished unitary headliner 12 assembly which can then be fitted as a unitary unit into a vehicle roof structure 10.

Figure 5:
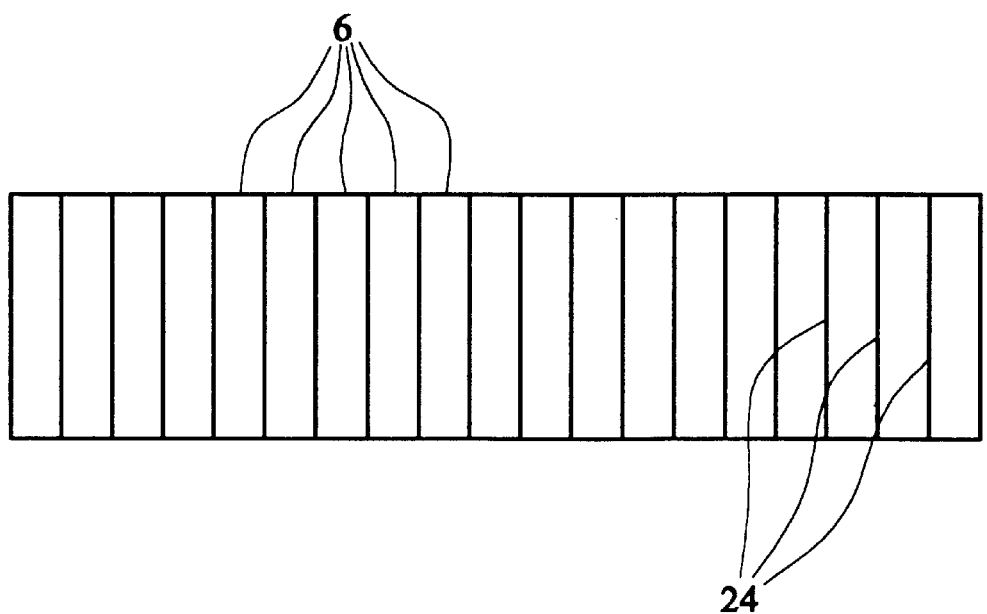

The molding operation G, H bends the fused tube planar elements 18. This causes deformation of the fused tube planar element 18, the internal structure of the fused tube planar element 18 and in particular causes bucking of the walls 24 of the tubes 6 within the fused tube planar element 18. In addition the molding alters the thickness of the element 18. During the molding operation G,H, and as the platens 21,22 are closed on the fused tube planar element 18, portions of the fused tube planar element 18 are crushed and compressed. This causes a permanent deformation of that portion of the fused tube planar elements 18 with a result that the portion of fused tube planar elements 18 is made thinner than other areas which are not, or are less crushed. The degree of crushing and compressing of the fused tube planar element 18 can be controlled by the complementary shape of the platens 21,22 and controlling the closing of the platens 21,22. The result of the molding operation G,H can be seen by comparing FIGS. 5 and 6 which show respectively cross sections (along the axes of the tubes 6) through the fused tube planar elements 18 before and after the molding operation G, H and clearly show the buckling of the tube elements 6 produced during the molding G, H.

Figure 6:
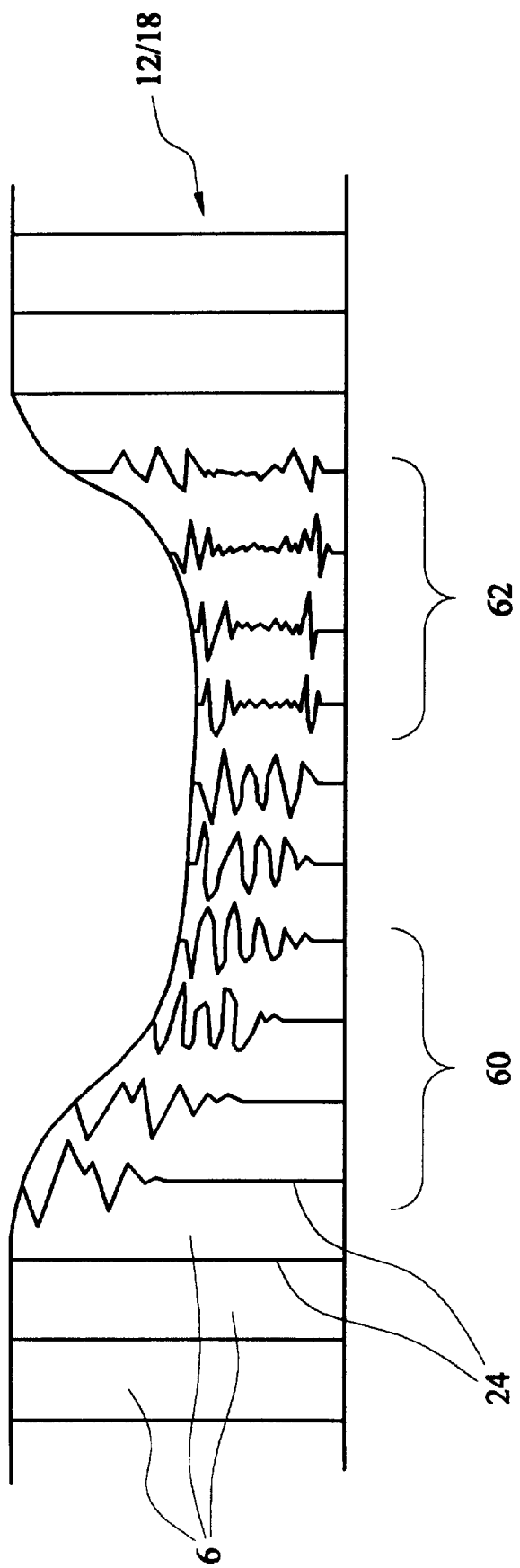
FIG. 6 is a detailed part illustrative view showing a cross section through the deformed internal structure of a molded fused tube element produced during the molding shaping process of the method shown in FIG. 2.

Referring to FIG. 6 the deformation of the walls 24 of the tube-like elements of the fused tube planar element 18 in response to the molding operation G,H is clearly shown. This deformation and buckling of the walls 24 reduces the length of the tube like elements 6 and therefore the thickness of the fused tube planar element in that region. During the molding operation G,H the fused tube planar element 18 may be heated from one or both sides (upper and lower). Such different heating causes different deformation during molding operation G,H. In FIG. 6 the deformation produced by heating from the upper side (top) of the fused tube planar element is shown in region 60, while in region 62 the deformation produced by heating from both sides (top and bottom) is shown. It will be appreciated that such different heating in a single element would not normally be carried out and that FIG. 6 is simply illustrative. As can be seen the walls 24 of the tube like elements 6 buckle and deform more easily adjacent to where the heating is applied during the molding operation G,H. Consequently as shown in region 60 most buckling occurs in the uppermost portions of the tube-like members 6, with the lower portions, which are away from the heating hardly deforming during molding. On the other hand with heating from both sides, as shown in region 62, buckling occurs in both the upper and lower portions with the center portion only slightly buckling. As is also shown in FIG. 6, the most buckling of the walls 24 of the tube-like members 6 occurs during the molding operation G,H where the thickness of the fused planar element 18, and so of the energy management element, is reduced the most by the molding operation. While FIG. 6 shows flat planar molding of the fused planar element 18, the molding can also be carried out to bend, shape and deform the planar element from its planar form. In such a case the walls 24 of the tube-like elements 6 in those regions where the fused planar element 18 is bent during the molding operation will buckle and deform in an analogous fashion to that shown in FIG. 6. The buckling of the tube-like elements 6 in such a situation allows the planar element 18 to be bent, deformed and shaped.

It has been found that by so molding the fused tube planar elements 18 and causing a permanent deformation and buckling of the internal tube structure, that the properties of the material are, and can be varied. In particular deformation and buckling of the internal tube structure alters the stiffness and resistance to deformation of the headliner structure to an impact force applied normal to the face of the headliner 12, generally the axial direction of the tubes 6, end on to the tubes 6. Consequently, different energy absorbing characteristics can be provided by adjusting the molding operation G,H to vary the permanent deformation of the fused tube planar elements 18 and in particular to vary the degree of buckling produced. Specifically initial deformation and buckling of the fused tube planar elements 18 reduces their stiffness, and/or in effect increases the resilience, in a direction normal to the axes of the tubes 6 as compared to the unbuckled and deformed fused tube planar element 18. It will be appreciated that an undeformed circular tube like member has a considerable stiffness and strength in an axial direction. By deforming the structure in the molding operation H, the cross section of the tube-like members 6 is altered from this circular or pure tube form, resulting in a commensurate reduction of the inherent strength and so stiffness. The resilience of the deformed structure is also increased since it is possible for the structure to bend and flex along the deformations and buckling lines produced during deformation. With the undeformed structure there are no deformation and buckling lines to provide any resilience and the undeformed structure will resist a load until it buckles, abruptly at a particular load. Further deformation and buckling however increases the density and stresses with a result that beyond a certain point the stiffness of the structure increases. In addition by compressing the fused tube planar element 18 within the molding operation G,H the thickness of the material is varied. This too has an effect on the energy management capability of the finally molded material.

From initial experimentation by those skilled in the art in implementing the invention, the level of buckling and deformation required to produce a required/desired stiffness and energy absorbent capability of the material, and the thickness to produce such a capability can be determined. These levels of deformation and buckling can then be reproduced and the molding apparatus 20 and molding operation G,H suitably designed and varied to produce the desired level of deformation and buckling. In this way the fused tube planar elements 18 and/or individual sections thereof, can be modified to provide the desired energy management properties.

It should also be noted that the fused structure 18 has a significant structural strength and integrity due to its fused unitary nature. The molding operation does not significantly affect this with the result that the molded fused structure and headliner 12 produced also have a significant structural strength and integrity. This can be contrasted with conventional foam inserts and energy absorbent members which generally have a lower structural strength and require reinforcing.

Figure 3:
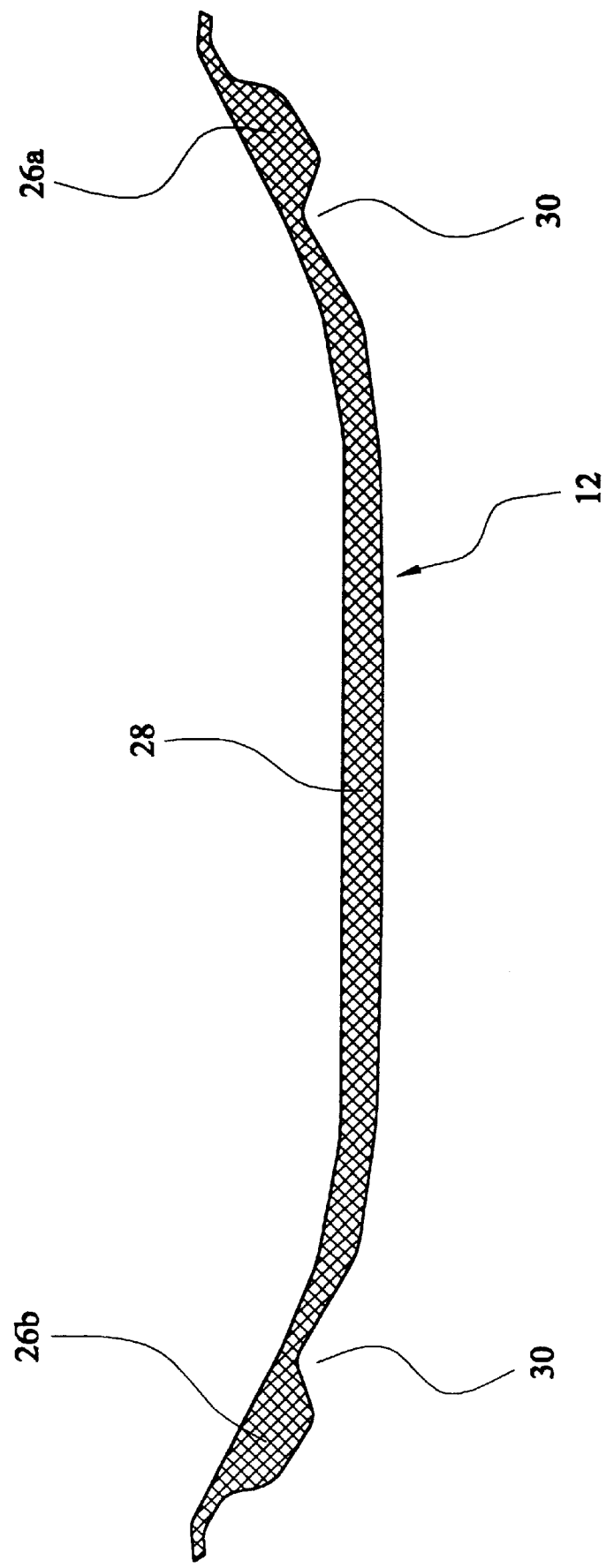
FIG. 3 is a transverse cross section of the headliner assembly produced by the method of FIG. 2.

The finished cross section of the headliner 12 is shown in outline detail in FIG. 3. As shown, the thickness of the headliner 12 varies with thicker edge portions 26a, 26b. The thicker edge portions 26a, 26b provide increased energy management function in these regions where, due to the rail members of the roof structure increase protections and padding is required to be provided. In addition, there are also thinner sections 30. These thinner sections 30 are provided in order to provide space between the headliner 12 and the roof structure 10 to accommodate, for example, wiring or screen wash tubes etc. which pass along the inside of the roof structure from the front to the rear of the vehicle. In the center region 28 of the headliner 12, and away from the strengthening rails, a lower energy management function is required to be provided by the headliner 12. Consequently, the headliner can be thinner in these regions 28. However, other factors, for example aesthetic appearance of acoustic properties may dictate that the thickness should be maintained and/or that a greater thickness than may be actually required to provide the required energy management function in these regions. It will be appreciated though that the thickness of the headliner 12 and variation in different regions will be dictated by the particular requirements of the vehicle within which the headliner 12 is installed. The variation is adjusted to provide the varied energy management function and also to shape the headliner 12 to the required shape to both fit in within the vehicle roof structure and accommodate other components within the roof.

This variation of the thickness of the headliner 12 is produced in this embodiment by the molding operation G,H and the permanent deformation which both vary the energy management properties and capability, as explained above, of the various sections 26a,26b of the headliner 12.

It should be noted that using this method of molding to vary the energy management capabilities, a unitary fused tube planar element 18 is produced with different regions having different properties, which in turn can be used to provide the main core element of a headliner assembly 12. This can be contrasted with prior art arrangements in which the energy management properties are varied by providing multiple separate additional inserts. Such prior art arrangements are considerably more complex to produce and involve a larger number of individual elements, in particular separate additional impact absorbing foam elements, to make up an energy management element or core of a headliner 12.

Figure 8:
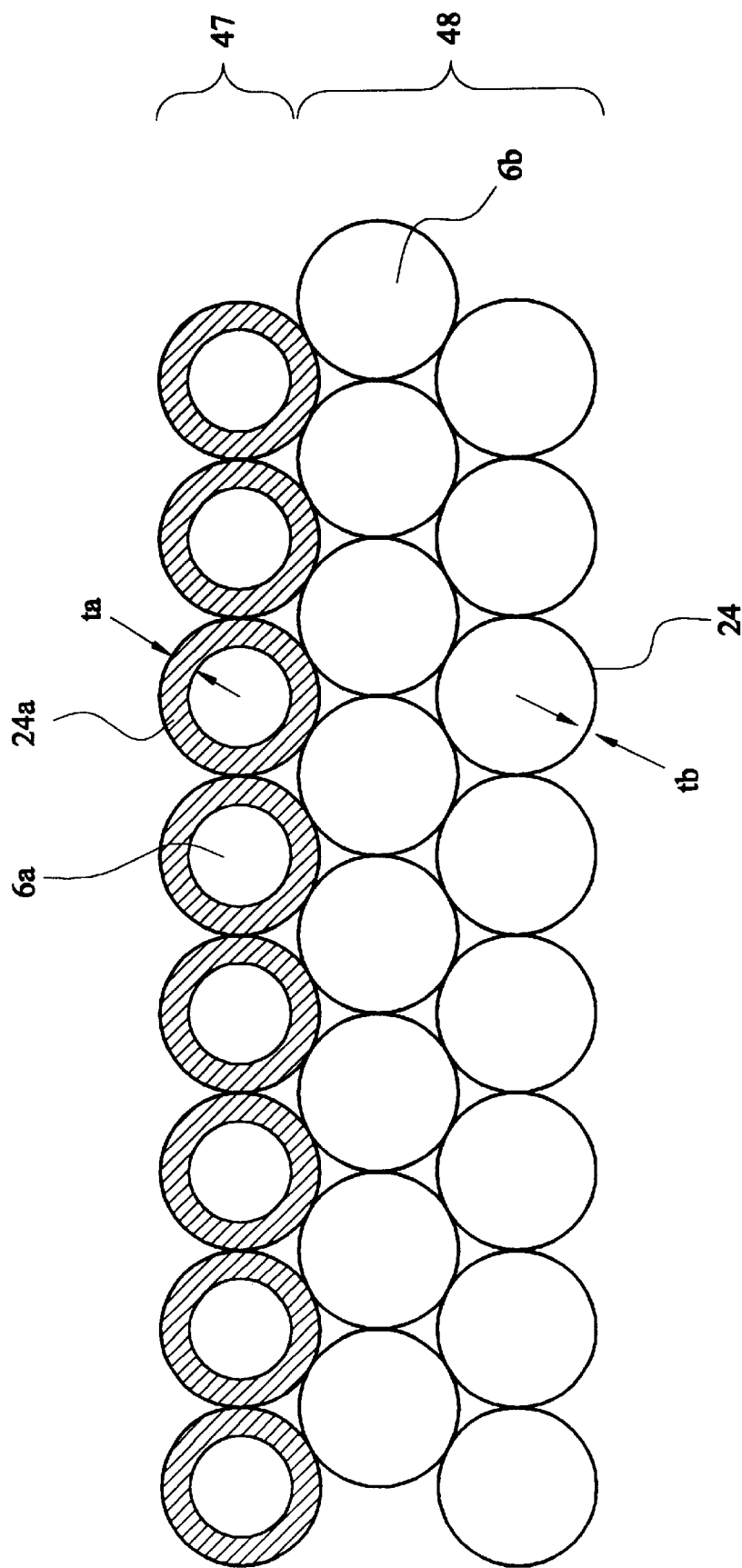
FIGS. 8 and 9 are respective part plan views, similar to that of FIG. 4, of alternative arrangements of the tubes elements, according to further embodiments of the invention and to be used in the method shown in FIG. 2 or other alternative methods of further embodiments.

Following on from this as well as, or alternatively, the energy management properties of a unitary fused tube planar element, of the material of a kind described, may be varied in selective regions in other ways. For example, as shown in FIG. 8, tubes 6 of differing wall thicknesses could be produced, with some tubes 6a having a thicker wall 24a thickness $t_a$ than other tubes 6b with a thinner wall thickness $t_b$. These different types of tubes 6a,6b can be closely packed within the same frame 8 with the tubes 6a,6b with different wall thicknesses $t_a,t_b$ being packed in selected regions 47 corresponding to where different energy management functions and characteristics (e.g. higher or lower) are required, for example in regions 47 corresponding to the edge portions 26a of the headliner 12. The thinner walled tubes 6b, which since they comprise less material by virtue of their thinner walls 24, are disposed in the remaining region 48 where less energy management function and impact absorbency is required. The different tubes 6a,6b closely packed in the frame 8 are fused into a one piece unitary fused tube array element which is an integrated one piece structural element. In this case, however, some regions will have tubes 6 with differing wall thicknesses and therefore will provide different energy management properties. In particular, those regions 47 which include the thicker tubes 6b will be stiffer and more robust by virtue of the thicker walls 24a and which provide different energy management properties and respond differently to impact than the remaining region 48 with thinner walled tubes 6a. In this way, and in part by virtue of the way the fused array is produced from individual tube elements (i.e. the way the material of the kind is produced) the element can be tailored to match the specific energy management requirements in a cost effective way.

Figure 9:
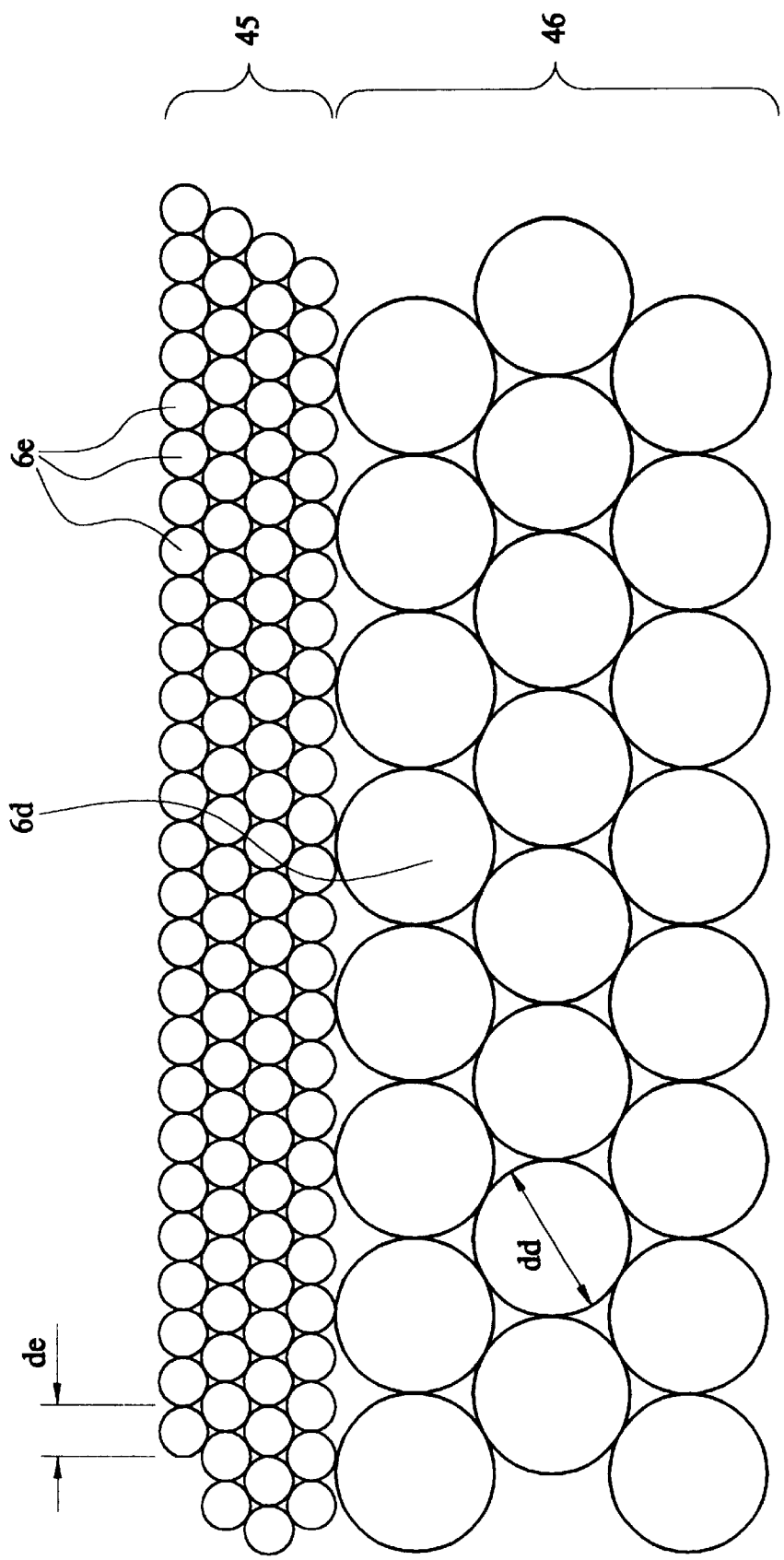

In a similar fashion, instead of using tubes 6a,6b of different wall thicknesses $t_a, t_b$, tubes 6d,6c of different diameters $d_d, d_c$ could be used in different regions 45,46 as shown in FIG. 9. Again, such an arrangement cost effectively produces in a unitary integrated structure regions of selectively different energy management characteristics, which can be matched to the required energy management requirements. It will also be appreciated that the different dimensions, thickness, and wall thickness of the tubes 6 effects the density and weight of the structure. Accordingly, by using different diameter, wall thickness etc. the weight and cost can be varied (reduced) where different energy management requirements allow. This is in contrast to a uniform structure and in some respects allow such honeycomb materials to be cost effectively used in a practical arrangement.

In a yet further variation along this theme, different tubes made of compatible, but different materials could be used in different regions. The different materials used for the different tubes having different properties and provide different energy management characteristics in the different regions where they are used within the unitary integrated structural element.

In addition, the selective variation of the energy management properties can also be achieved by selective filling (either partial or complete) selected of the tubes 6. Such filling will effect how the tubes 6 deform as they are crushed under an impact load thereby varying the energy management characteristics.

It will be appreciated that these individual ways of providing different selective variations in the energy management function could be combined in many varied combinations in further embodiments. For example, different tubes with both different diameters and wall thicknesses could be used. The fused array so produced could also be molded to further vary the energy management characteristics in selective regions of the integrated unitary element. They can also be used with or without molding and the principle may be extended to other honeycomb structures comprising tubular elements produced in alternative, suitably adapted, ways in order to take advantage of the principles described.

As shown in FIG. 2, the former 8 into which the tubes 6 are closely packed can be of a generally rectangular shape. This produces generally rectangular fused tube planar elements 18. Such generally rectangular fused tube planar elements 18 will then need to be trimmed to size and shape in order to produce the finished headliner 12 which conforms and fits within the vehicle roof 10. To address this, and reduce the amount of trimming required a former 8' of a more complex shape, as shown for example in FIG. 7, could be used.

Figure 7:
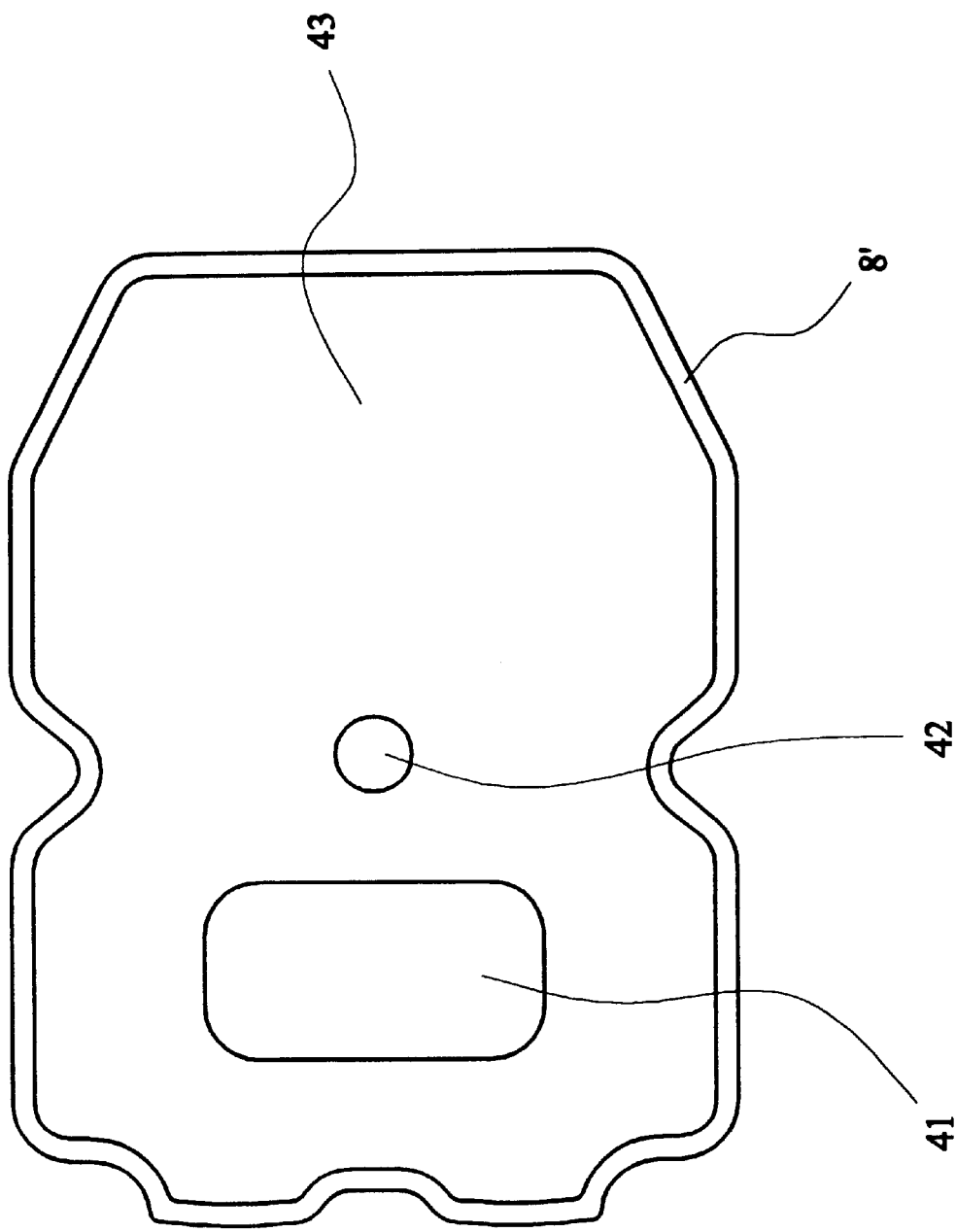
FIG. 7 is a plan view of a shaped former which may optionally be used in the method shown in FIG. 2.

Referring to FIG. 7, an alternative former or frame 8' within which the tubes 6 are closely packed could have a shape and outline generally corresponding to the required shape of the headliner 12 to be produced. Furthermore, suitable apertures (required for the sunroof, or other fittings) within the fused tube element produced can be defined using plug sections 42,41 within the former or frame 8'. These plug sections 41,42 would have a shape corresponding to the aperture to be provided in the element produced. For example, as shown, plug section 41 has a shape corresponding to the aperture for a sunroof and plug section 42 has a shape corresponding to the aperture for the interior light fitting. These plug sections 41,42 occupy some of the space 43 within the former 8', with the tubes 6 being closely packed around the plug sections 41,42. Using such a shaped former or framed 8' and/or suitable plug sections 41,42 a fused tube element of a near net shape, which is generally of the required shape of the final headliner 12 can be directly produced. Consequently, little or minimal further trimming is required and wastage of material is considerably reduced. Indeed, it has been calculated that by directly producing a fused tube array in this way, with such a near net shape, a 15 to 30% reduction in material required and wastage could be achieved.

In the finishing operational step, indicated as I in FIG. 2, a decorative covering can be added, attached, and fitted, over the molded fused element in order to produce the finished headliner with a suitable appearance. Suitable coverings are well known to those in the art along with suitable methods for applying such coverings. It is mentioned however that the coverings may, in particular embodiments, be preferably added and fitted during the molding operation G,H. This could be done by interposing the cover material between the fused tube planar element 18 and the platen or platens 21,22. During the molding operation H this cover material can be bonded to the fused tube planar element 18, due to the molding pressure and adhesive which may be applied on the cover material. Alternatively, the cover material could be applied to the fused planar element prior to the molding operation H and laminated onto the fused planar element. Suitable methods for attaching cover materials are well known in the art and accordingly any conventional suitable method could be used.

Figure 10:
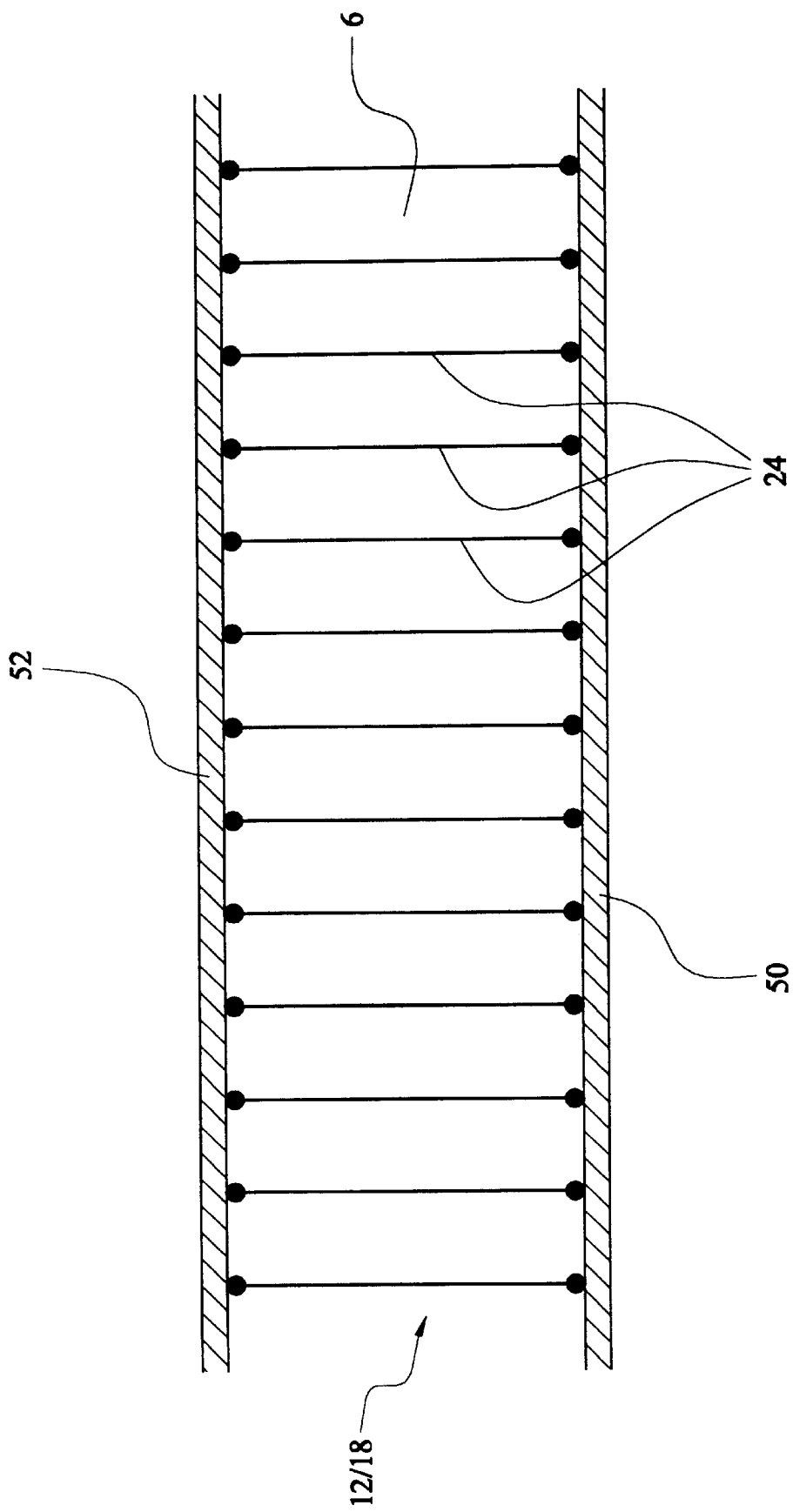
FIG. 10 is a cross sectional side view similar to that of FIG. 5 but showing an alternative embodiment in which cover panels are attached to the fused tube element.

In addition, or alternatively, to attaching decorative cover materials to the fused tube element, other covering materials and/or panels or sheets 50,52 could in further alternative embodiments be attached to the fused tube element, as shown for example in FIG. 10. These cover panels 50,52 could be attached over the entire fused tube elements 18 on one or (as shown in FIG. 10) both sides or indeed at specific localized positions. These cover panels 50,52 can be attached by similar means to the attachment of the decorative coverings and suitable methods for attaching them are generally well known in the art. Such cover panels, may be made for example from fiberglass, hemp, natural fibers or blends of fibers, would provide further structural strengthening with an I beam type configuration being defined by the cover panels 50,52 and the tube 6 walls 24. The cover panels 50,52 also, by defining discrete enclosed chambers in conjunction with the tubes 6, improve the acoustic properties. The cover panels 50,52 will also assist in distributing an impact load over the tubes 6 and tube walls 24.

In this description generally circular tubes 6 have been described as being used to produce the fused element. While such a cross sectional shape is preferable due to the strength of a circular cross section, it will be appreciated that other cross sectional shapes could be used. The tubes 6, in other embodiments, could have for example a square, rectangular, octagonal, or other polygonal, cross sectional shape. The tubes 6 could also possibly have an oval or other curved cross sectional shape. The term tube-like and reference to tubes should therefore be construed, in the broadest aspects of the invention, in general terms to refer to any substantially hollow elongated member, of which relatively short laterally connected lengths may be used to form, or be defined in, a coherent cellular structure.

It will also be appreciated that while a particular method for producing the material of the kind described comprising the fused array of tube like elements has been described, other methods of producing such a material for use in producing an energy management structure for a headliner 12 can be used, and adapted to adopt the invention. Indeed, the principle of providing zones/regions of differing energy management properties, in an energy management element comprising a unitary or coherent structure can be applied to other honeycomb like or cellular or similar such materials produced in other ways. Such materials comprise in effect a structure (honeycomb or cellular structure) with at least one wall which defines a number of interconnected cellular elements. The cellular elements in such materials are disposed laterally and adjacent to each other. Accordingly, such alternative materials and methods of producing them, which because they incorporate a similar type of tubular structure (and in particular a structure defining an array of laterally interconnected tubular elements) would behave in some respects in a similar fashion as described above.

In the preferred arrangements, as described, the walls 24 of the tubes 6, walls forming the honeycomb or cellular structure, and axes of the tubes or cells defined extend generally in the direction of the anticipated impact force (i.e. as shown the tubes 6 extend through the thickness of the energy management element 12). The impact force generally occurs and is applied normal to the facing surface of the energy management element. When an impact force is applied to the facing surface of the energy management element 12 the walls 24 of the tubes 6 or walls forming the honeycomb or cellular structure collapsibly deform and/or buckle under the impact load. In other words, the structure which includes voids defined by the tubular elements, is crushed and crushable under impact. As they deform or buckle and the structure is crushed the energy of the impact is absorbed. The different physical properties and/or structural arrangements (as described above) alter the way and force required to deform and/or buckle the energy management element 12 and internal structure thereof. This in turn will therefore determine the impact force/energy absorbed as impact force deforms/buckles the energy management element, and so determines the level of energy management provided.

It will be appreciated that although described in relation to producing vehicle headliners 12 the method can also be used to produce other trim panels and/or energy absorbent structures generally.

Further specific embodiments of the invention will be apparent to those skilled in the art. The above provides the technically competent worker in the field with sufficient information, starting from the materials of the kind described to use and modify same in accordance with the principles described above.

What is claimed is:

1. An automotive interior trim product comprising an energy management element, said energy management element being adapted to be secured to an automotive interior as a trim product to provide energy management functions and extending into zones of said interior having different levels of energy management requirements, said energy management element being fabricated from a material including a coherent structure with an array of laterally interconnected tubular elements, said energy management element comprising a one-piece unitary structure with zones of differing physical properties produced as a result of localized differences in the structure of the energy management element, and wherein said localized zones of said energy management structure with differing localized physical properties are capable in use of providing different levels of energy management whereby the energy management provided by the energy management element can be matched to the energy management requirements of said zones of said interior having different levels of energy management requirements.

2. An automotive interior trim product comprising an energy management element fabricated from a material having a coherent structure with an array of laterally interconnected tubular elements, the element comprising a one-piece unitary structure with zones of differing physical properties produced as a result of localized differences in the structure of the energy management element.

3. An automotive interior trim product as claimed in claim 2 in which the energy management element is fabricated from an array of laterally interconnected tubular elements comprising at least in a first region of the array a first type of tubular members with substantially the same physical characteristics, and in a second region a second type of tubular members having at least one physical characteristic that is different from the first type of tubular members.

4. An automotive interior trim product as claimed in claim 3 in which the tubular members of said first type have different cross sectional dimensions to those of the tubular members of said second type.

5. An automotive interior trim product as claimed in claim 3 in which said first and second types of tubular members have different wall thicknesses.

6. An automotive interior trim product as claimed in claim 3 in which the first and second types of tubular members are made from different materials.

7. An automotive interior trim product as claimed in claim 2 comprising in further regions of the array, further different types of tubular members, wherein each different type of tubular members has at least one physical characteristic that is different from every other type of tubular members.

8. An automotive interior trim product as claimed in claim 7 in which at least two regions include tubular members of the same type.

9. An automotive interior trim product as claimed in claim 2 in which the tubular members have a substantially circular cross section.

10. An automotive interior trim product as claimed in claim 2 in which the tubular members have a substantially polygonal cross section.

11. An automotive interior trim product as claimed in claim 10 in which the tubular members have a substantially four sided polygonal cross section.

12. An automotive interior trim product as claimed in claim 2 in which at least some of the tubular members of energy management element are at least partially filled with filling material.

13. An automotive interior trim product as claimed in claim 2 in which said energy management element comprises a molded array of laterally interconnected tubular elements wherein said molded array includes tubular elements having walls at least partially buckled.

14. An automotive interior trim product as claimed in claim 13 in which said array of laterally interconnected tubular elements is permanently deformed by said molding.

15. An automotive interior trim product as claimed in claim 14 in which the tubular members in a localized zone are buckled by molding said array of laterally interconnected tubular elements.

16. An automotive interior trim product as claimed in claim 2 which the zones of differing physical properties are comprised by zones of different thickness of the said array of laterally interconnected tubular elements comprising the energy management element.

17. An automotive interior trim product as claimed in claim 2 further comprising a cover panel disposed on top of at least a part of the energy management element.

18. An automotive interior trim product as claimed in claim 17 in which the cover panel is decorative.

19. An automotive interior trim product as claimed in claim 18 further comprising a second cover panel, the cover panels disposed on opposite sides of the array of tubular members such that the array of tubular members is sandwiched between the cover panels.

20. An automotive interior trim product as claimed in claim 19 in which the cover panels are attached to the array of laterally interconnected tubular members.

21. An automotive interior trim product as claimed in claim 2 in which the material comprising a coherent structure comprising an array of laterally interconnected tubular elements is fabricated from a plurality of discrete tubular members which are fused or bonded together.

22. An automotive interior trim product as claimed in claim 2 in which the automotive interior trim product is a headliner.

23. An automotive interior trim product as claimed in claim 2 in which the energy management element is shaped by molding said element to produce a shaped element and an automotive interior trim product of a required shape.

24. An automotive interior trim product comprising an energy management element, said energy management element being adapted to be secured to an automotive interior as a trim product to provide energy management functions, said energy management element comprising a coherent structure comprising an array of laterally interconnected tubular elements, said element comprising a one-piece unitary structure, and wherein said energy management element is adapted to be crushable with the tubular members adapted to be deformable in response to an impact, in order to absorb in use at least a portion of the impact energy and thereby provide an energy management function.

25. An automotive interior trim product as claimed in claim 24 in which said energy management element comprising a coherent structure comprising an array of laterally interconnected tubular elements comprises a honeycomb structure with at least one wall structure which defines an array of laterally interconnected cellular members.

26. An automotive interior trim product as claimed in claim 24 in which said energy management element comprising a coherent structure comprising an array of laterally interconnected tubular elements comprises a honeycomb structure with at least one wall structure which defines an array of laterally interconnected tubular members.

27. A method of producing an automotive interior trim product of claim 1 comprising the following steps:
(a) producing an energy management element comprising a unitary one piece structure from a coherent structure comprising an array of laterally interconnected tubular elements;
(b) providing localized zones of said energy management element with differing localized physical properties which provide different levels of energy management;
(c) matching the energy management provided by the energy management element to the energy management requirements of the interior.

28. A method as claimed in claim 27 in which the energy management element is produced by:
producing a block of material comprising a coherent structure comprising an array of laterally interconnected tubular elements;
slicing said block to produce a series of planar elements each of which comprises said energy management element.

29. A method of producing an interior trim product as claimed in claim 28 wherein said block is sliced along a plane across the axes of the tubular members.

30. A method of producing an automotive interior trim product as claimed in claim 27 in which step a) of producing said energy management element comprises the following steps:
(a) producing a plurality of tubular members,
(b) closely packing the plurality of tubular members within a frame assembly in an array;
(c) heating or bonding the array of closely packed tubular members to fuse or bond the tubular members together to form a coherent structure comprising an array of laterally interconnected tubular elements.

31. A method of producing an interior trim product as claimed in claim 30 in which the frame assembly within which the tubular members are closely packed, has a plan shape generally corresponding to that of the outline shape of the automotive trim product.

32. A method as claimed in claim 31 in which the frame assembly includes at least one plug member disposed within the frame and around which the tubular members are closely packed.

33. A method as claimed in claim 32 in which the at least one plug member has a shape which corresponds to an aperture which is to be defined within the automotive trim panel.

34. A method of producing an interior trim product as claimed in claim 27 further comprising applying a decorative cover material to a surface of said energy management element.

35. A method as claimed in claim 27 to further comprising molding said energy management element.

36. A method is claimed in claim 35 in which said molding of said energy management element is arranged to adapt localized zones of said energy management structure to have differing localized physical properties.

37. A method of producing an interior trim product as claimed in claim 35 in which the molding partially buckles at least some of the tubular members.

38. An automotive interior assembly comprising:
a vehicle roof; and
a headliner attached to said roof, said headliner including a unitary energy management element with an array of laterally interconnected tubular elements adapted to be deformable in response to an impact to absorb impact energy, said vehicle roof and headliner cooperating to provide a value not more than 1,000 HIC(d) thereacross as measured in accordance with Federal Motor Vehicle Safety Standard 201.

39. An automotive interior assembly comprising:
a vehicle roof; and a headliner attached to said roof, said headliner including a unitary energy management element having zones of differing physical properties produced as a result of localized differences in the structure of the unitary energy management element, thereby providing localized differences in energy absorption characteristics, said vehicle roof and headliner cooperating to provide a value of not more than 1,000 HIC(d) at each said zone across the headliner as measured in accordance with Federal Motor Vehicle Safety Standard 201.

* * * * *